E. C. VILLIERS.
GEARING.
APPLICATION FILED OCT. 30, 1919.
1,368,587.
Patented Feb. 15, 1921.
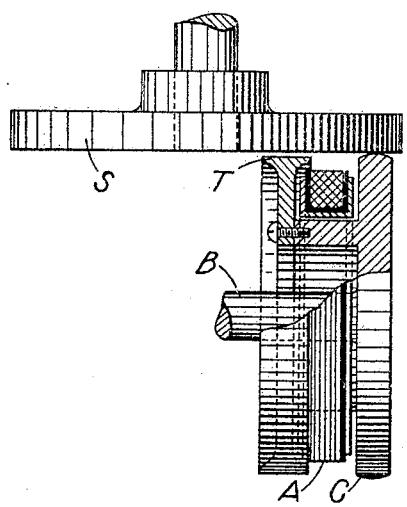

UNITED STATES PATENT OFFICE.

EDWARD CECIL VILLIERS, OF ASCOT, ENGLAND.

GEARING.

1,368,587. Specification of Letters Patent. Patented Feb. 15, 1921.

Application filed October 30, 1919. Serial No. 334,609.

*To all whom it may concern:*

Be it known that I, EDWARD CECIL VILLIERS, a subject of the King of Great Britain and Ireland, residing at Hendersyde, Ascot, Berkshire, England, have invented new and useful Improvements in Gearing, of which the following is a specification.

This invention relates to rectangular friction gearing. According to my present improvements, the adhesion of the parts required to be geared together is obtained by magnetic attraction without relying upon either external pressure or toothed engagement of the geared parts. Noise and friction and wear of surfaces are thus reduced or eliminated.

My invention can be applied to different objects, among which may be mentioned that of varying the speed or reversing the direction of wheels, rollers disks or shafts in various mechanisms. Such wheel or its periphery may be either smooth, roughened or milled. For this purpose the contacting surfaces are made of magnetizable material. A thin layer of non-magnetic material may, however, be interposed without greatly impairing their magnetic adhesion.

In order to gain the desired results, the wheel, roller, or the like—hereinafter termed the wheel for brevity—is magnetized by an electrically energized coil in its vicinity. The wheel may be either solid or laminated. The coil may be either stationary or rotatable.

According to my invention, the magnetic wheel or disk is arranged to drive another wheel or disk at right angles to it and at different speed ratios and in forward and reverse directions with a full stop between them by the simple operation of traversing one of said wheels or disks across the other.

In magnetic wheels or disks of certain proportions, it may be found convenient to wind the magnetizing coil in a groove around the wheel itself.

The invention is illustrated by the accompanying drawings, to which reference will hereinafter be made.

It must be understood that the drawing shows an example of only one form which my invention may take and it is not to be considered as limiting my claims.

The energizing coil A is shown around the shaft B and it may be either suitably held so as not to rotate therewith or it may be mounted to revolve with the wheel C when it will be conducted through brushes to collecting rings or ring contacts.

The friction wheel C bears against the flat surface of a wheel S at right angles to it and the relative positions of the wheels can be varied by any suitable means. A recess for the coil A is provided against the periphery of the wheel C and an iron retaining ring T of slightly smaller diameter than the wheel C secured to the latter. The face of this wheel rim T is preferably widened to present a large surface adjacent to the wheel S, a small air gap being left between them. Devices have been proposed to produce frictional contact between two parallel disks and another disk at right angles to them by the aid of separate not revoluble electromagnets, tending to draw the parallel disks together, the latter acting as armatures of the magnet, such arrangement necessitating more than one air gap, which impairs the effectiveness of the magnetic circuit, and has other disadvantages as compared with my invention.

I claim:—

1. In rectangular frictional gearing, a shaft carrying a friction wheel of magnetizable material, a flange also of magnetizable material upon the same shaft, an electro-magnetic coil coaxial with said shaft between the wheel and the flange, and another magnetizable wheel or disk at right angles to the first mentioned wheel so placed that the first mentioned wheel makes frictional contact with one of the flat faces of the said other wheel, thereby rotating the latter when rotated, a gap being provided between the flange aforesaid and the said flat face.

2. In rectangular frictional gearing, a magnetizable wheel having a magnetizable flange spaced a little distance from it and an electro-magnetic coil coaxial between the wheel and the flange, together with a disk wheel of magnetizable material mounted at right angles to the other wheel so as to present to the edge of the latter one of its flat faces, the diameter of the flange aforesaid being slightly less than that of its wheel so that a gap occurs between the periphery of said flange and the face of the disk wheel upon which the other wheel is adapted to roll.

EDWARD CECIL VILLIERS.